United States Patent [19]

Hyogo et al.

[11] Patent Number: 4,929,182

[45] Date of Patent: May 29, 1990

[54] MOUNTING CONSTRUCTION FOR ON-VEHICLE ELECTRICAL CONNECTION APPARATUS

[75] Inventors: Yukihiro Hyogo; Akio Kurihara, both of Shizuoka, Japan

[73] Assignee: Yazaki Corporation, Tokyo, Japan

[21] Appl. No.: 378,672

[22] Filed: Jul. 12, 1989

[30] Foreign Application Priority Data

Jul. 13, 1988 [JP] Japan .................. 63-172576

[51] Int. Cl.[5] .......................................... H01R 33/00
[52] U.S. Cl. ......................................... 439/34; 180/90
[58] Field of Search ................................. 439/34–36, 439/65, 248; 180/90

[56] References Cited

U.S. PATENT DOCUMENTS

| | | | |
|---|---|---|---|
| 3,174,576 | 3/1965 | Woofter et al. | 180/90 |
| 4,255,005 | 3/1981 | Fukunaga | 439/65 |
| 4,360,241 | 11/1982 | Fukunaga | 439/34 |

FOREIGN PATENT DOCUMENTS 5737625  8/1980  Japan .

Primary Examiner—Eugene F. Desmond
Attorney, Agent, or Firm—Armstrong, Nikaido, Marmelstein, Kubovcik & Murray

[57] ABSTRACT

A mounting construction of an on-vehicle electrical connection apparatus comprises a first electrical connection apparatus secured to a car body and a second electrical connection apparatus which is connected to the first electrical connection apparatus. An instrument panel frame secured to a dash board while temporarily holding the second electrical connection apparatus so that the second electrical connection apparatus opposes the first electrical connection apparatus. An instrument board is mounted to the instrument panel frame. The instrument board being electrically connected to the second electrical connection apparatus by means of connectors.

4 Claims, 5 Drawing Sheets

MOUNTING CONSTRUCTION FOR ON-VEHICLE ELECTRICAL CONNECTION APPARATUS

BACKGROUND OF THE INVENTION

1. Field of the Invention

The present invention relates to a mounting construction which facilitates electrical connection between electrical connection apparatuses and between the apparatuses and an instrument panel within a limited space such as instrument panels of a vehicle.

2. Prior Art

Conventionally, the electrical connection to an instrument board within the instrument panel of a vehicle has been made by directly inserting the connectors of a wire harness fixed to the car body into the mating connectors provided on the instrument board, or by first connecting the harness to an electrical connection apparatus and then connecting the electrical connection apparatus to the instrument board through connectors provided on both the apparatus and the instrument board. The wire harness side is secured to the car body before the instrument is assembled. Meanwhile the instrument board is assembled on an instrument panel frame to form a dash board assembly which is mounted later in place on the car body, thereby allowing fitting engagement between the instrument board side and the harness side, or between the instrument board and the electrical connection apparatus.

However, with this type of construction, fitting between the wire harness side and the instrument board side or between the connection apparatus side and the instrument board side takes place at the same time as assembling the dash board assembly to the car body. Thus normal fitting between the wire harness side or the apparatus side and the instrument board side may not be accomplished in some cases due to positional misalignment between the connectors. A construction for overcoming the aforementioned drawback is disclosed in Japanese Patent KOKAI Publication No. 57-37625 in which the connector of the wire harness side can be adjusted its location both in vertical direction and in horizontal direction along the wall surface of the electrical connection apparatus. However the prior art construction suffers from a problem that it is not easy to access the connector of the wire harness in order to align the location thereof relative to the instrument board because the wire harness is located behind the instrument board.

A dash board assembly is large and heavy as compared to connectors and accordingly position alignment between the connectors on the dash board and their mating connectors requires much labor and time in assembly stage. The time consuming assembly stage has been a large barrier that hampers improvement of productivity at vehicle manufactureres side.

The wire harness has a number of joints and branches for electrical connections between various electrical components and meters which are resident in the instrument panel. Therefore the diameter of the wire harness tends to become large as well as wiring manner become increasingly complicated. If all of these jointing portions are to be housed in the electrical connection apparatus secured to the car body, then circuits within the connection apparatus will be necessarily complex, causing difficulty in manufacturing the instrument panel assembly.

SUMMARY OF THE INVENTION

An object of the present invention is to provide a mounting construction which simplifies the wire harness and the electrical connection apparatus as well as facilitates connector jointing between electrical connection apparatuses and between the apparatuses and the electric components such as the instrument board, thereby permitting easy and quick connection work.

A mounting construction of an on-vehicle electrical connection apparatus according to the present invention comprises a first electrical connection apparatus secured to a car body; a second electrical connection apparatus electrically connected to the first electrical connection apparatus; an instrument panel frame secured to a dash board while temporarily holding the second electrical connection apparatus opposing the first electrical connection apparatus; an instrument board mounted to the instrument panel frame, the instrument board being electrically connected to the second electrical connection apparatus by means of connectors.

BRIEF DESCRIPTION OF THE DRAWINGS

Features and other objects of the invention will be apparent from the following description of preferred embodiments with reference to the accompanying drawings in which.

DESCRIPTION OF PREFERRED EMBODIMENTS

Embodiment

Figure 1:
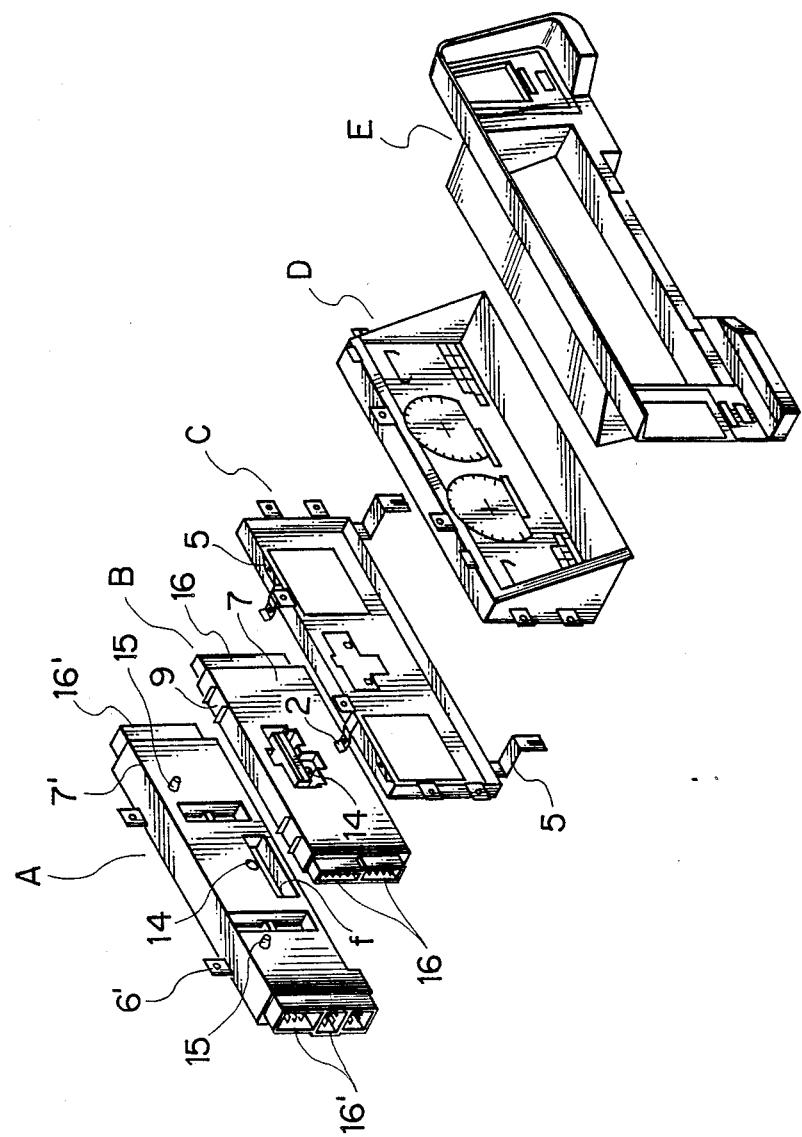
FIG. 1 is an exploded perspective view for illustrating an embodiment of a mounting construction according to the present invention.

The present invention will now be described in detail with reference to the drawings. FIG. 1 is an exploded perspective view for illustrating an embodiment of a mounting constrution according to the present invention. A female connector f is provided on the surface of an electrical connection apparatus A and a male connector m (refer to FIG. 5) to which the female connector f is to be matinly inserted is provided on the surface of an electrical connection apparatus B which is opposing the surface of the apparatus A. Within each of the apparatuses A,B is housed a circuit including a number of branching circuits that are formed of well known components such as bus bars. The circuit is divided roughly into two parts, joint portions or branching circuits of the wire harness side that is mounted on the car body being housed in the apparatus A and the joint portions for an instrument board D side being included in the apparatus B, thereby simplifying the entire circuit arrangement. An instrument panel frame C is used to secure the instrument board D and has a retaining means for temporarily fixing the electrical connection apparatus B thereon, which will be described later. A meter hood E is attached to the front of the instrument board D.

Figure 2:
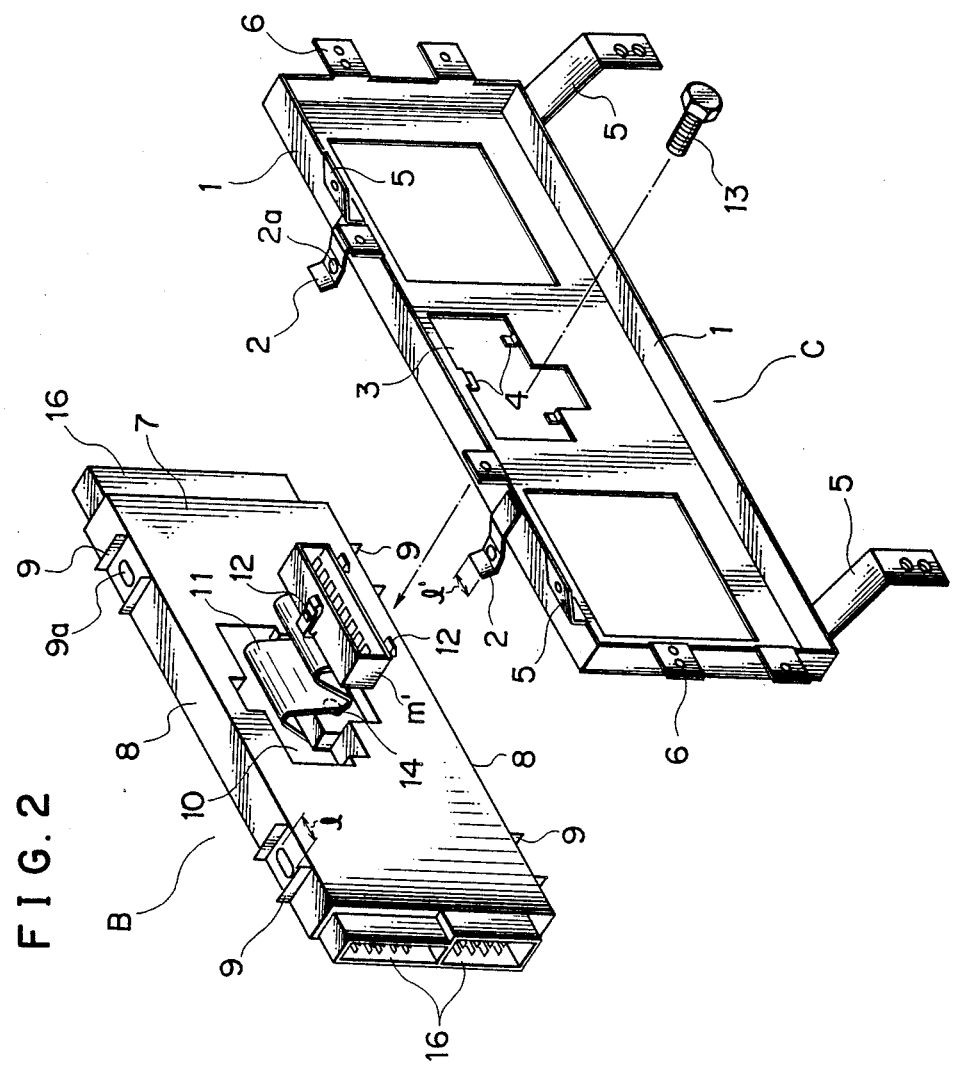
FIG. 2 is an enlarged perspective view of an electrical connection apparatus B and an instrument panel frame C in FIG. 1.

Referring to FIG. 2, on the left and right sides of each of the upper and lower frame walls 1 of the instrument panel frame C are provided two leaf springs 2 that have a protrusions 2a and are mounted to extend toward the middle of the instrument panel frame C. In the middle of the frame C is provided a fitting opening 3 for receiving the male connector m', which is used for electrically connecting the connection apparatus B to the instrument board D. Arm retaining members 4 are provided to project into the opening 3, one at the upper edge and two at the lower edge of the opening 3. Mounting arms 5 are mounted to the frame wall 1, two on top edge and two on the bottom edge thereof. Also mounted to the frame wall 1 are mounting straps 6 for mounting the instrument board D to the frame C.

Figure 4:
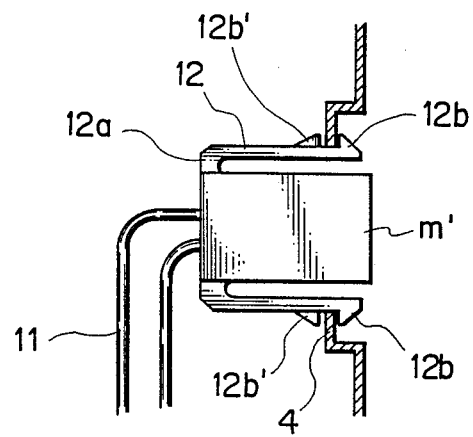
FIG. 4 is a cross-sectional view of an essential portion of a male connector m' in FIG. 3 when it is in locked-up conditions.

On the upper and lower walls 8 of a case 7 of the electrical connection apparatus B are provided spring receiving portions 9 for receiving the leaf springs 2 and elongated engagement grooves 9a for receiving the protrusions 2a. The length l of the elongated engagement groove 9a is greater than the width l' of the leaf spring 5 so that the apparatus B is guided by engagement between the protrusions 2a and the engagement grooves 9a to slide to left and right. At the middle of the case 7 is provided an opening 10 through which the male connector m', which is connected to the circuit in the apparatus B via a flexible flat cable (or flexible printed circuit board) 11, is allowed to be drawn out of or into the case 7. The male connector m' is provided on its outer wall with a resiliently locking arms 12 that engage the arm retaining members 4 of the frame C. As shown in FIG. 4, each of the locking arms 12 extends forwardly of the male connector m from a bottom portion 12a and has a pair of opposing clamps 12b, 12b' at its tip end.

Figure 3:
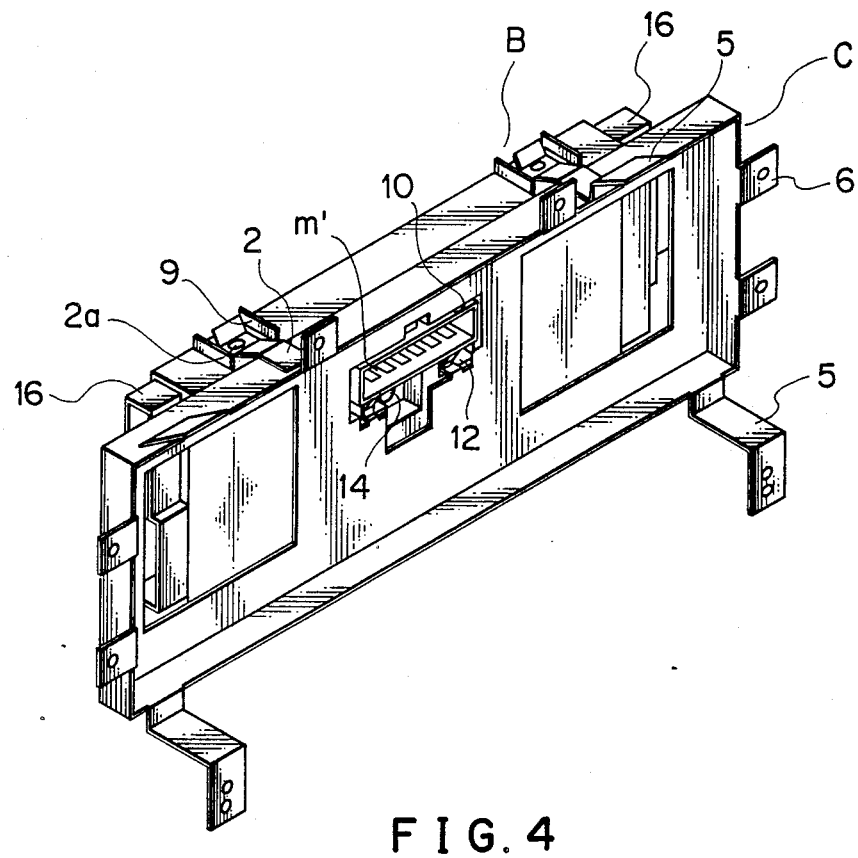
FIG. 3 is a perspective view of the electrical connection apparatus B and the instrument panel frame C in FIG. 1 when they are assembled together.

As shown in FIG. 1 and FIG. 3, the electrical connection apparatus A,B are each provided with a through-hole 14 through which a bolt 13 is inserted. The apparatus A is provided with a plurality of guide pins 15 which are guided into the mating pin holes 15' on the apparatus B when assembled. Connectors 16,16' to which the wire harnesses not shown are to be connected are provided at the left ends and the right ends of the cases 7,7' of the apparatuses A,B, respectively.

Operation

Figure 5A:
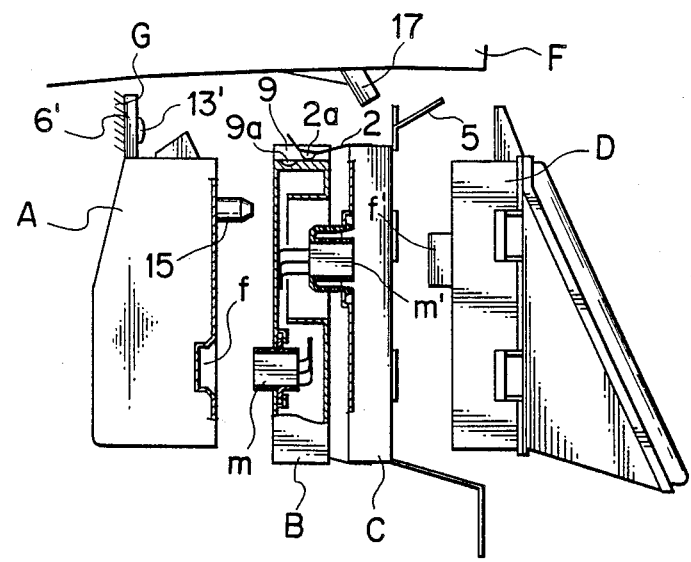
FIG. 5A to FIG. 5D are illustrative diagrams for showing various assembly stages of FIG. 1.
Figure 5B:
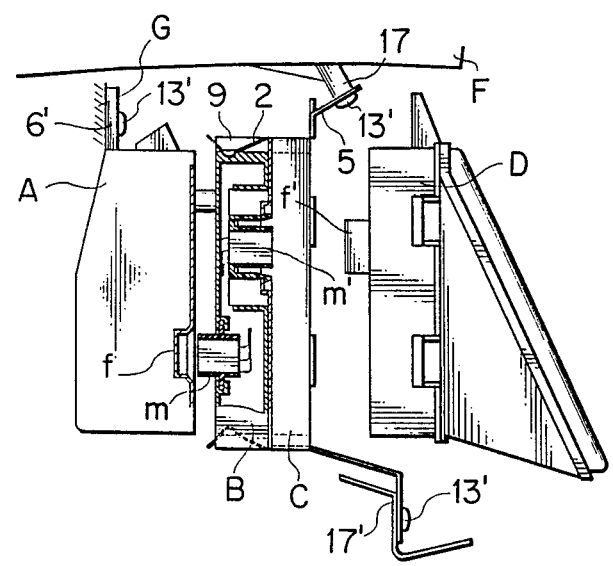
Figure 5C:
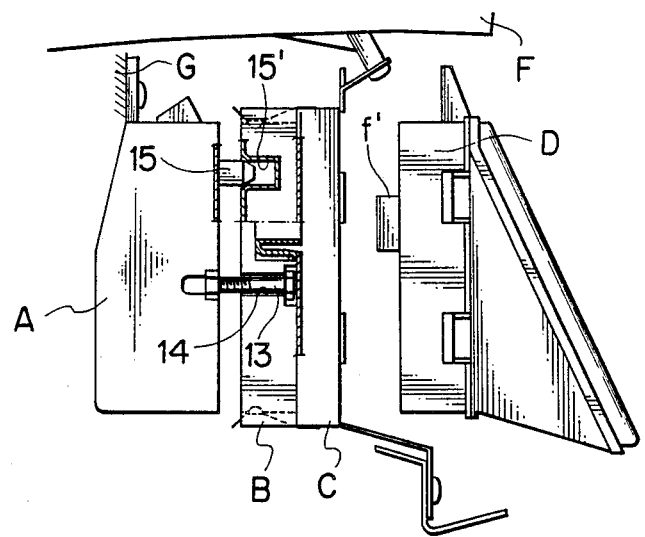

The operation of the embodied apparatus will now be described with reference to FIGS. 5A–5D. As shown in FIG. 5A, the electrical connection apparatus A is first secured to a fire board G of the dash board F by means of the mounting strap 6' and the bolt 13'. Then a dash board assembly is assembled by combining the instrument panel frame C and the electrical connection apparatus B in the following manner.

The male connector m' through which electrical connection between the apparatus B and the instrument board D is made, is locked to the instrument panel frame C at the fitting opening 3 by means of engagement between the arm retaining members 3 and opposing clamps 12b, 12b' of the male connector m'. The electrical connection apparatus B is temporarily supported by the instrument panel frame C through engagement between the upper and lower leaf springs 2 and the engagement grooves 9a of the spring receiving portions 9, thus providing the dash board assembly.

Then the dash board assembly is secured at the mounting arms 5 of the instrument panel frame C by means of the bolts 13' to a predetermined positions of the car body, i.e., the mounting seats 17, 17'.

Loosely fitted relation between the protrusions 2a and the engagement grooves 9a allows the apparatus B to be adjusted its vertical position and horizontal position relative to the apparatus A that has been secured to the car body, which will in turn facilitate quick fitting of the guide pins 15 with the mating pin holes 15'. Once the apparatuses A and B are aligned their positions with each other, the bolt 13 is inserted through the through holes 14 of the apparatuses A,B and is tightened to cause the apparatus B to move forwardly, while at the same time the protrusions 2a being driven out of fitting engagement of the engagement groove 9a. Thus the female connector f of the apparatus A is smoothly connected to the male connector m of the apparatus B.

Figure 5D:
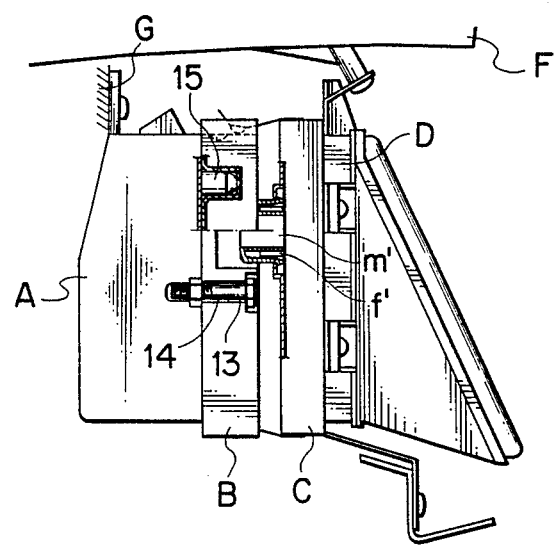

Thereafter the instrument board D is fitted into the instrument panel frame C as shown in FIG. 5D. This ensures exact, accurate fitting relation between the male connector m' on the instrument panel frame C and a female connector f' on the instrument board D.

According to the present invention, assembly of electrical connection apparatuses A,B and the instrument board is accomplished in the following manner. Connection between the fire board G and the apparatus A is first accomplished, then connection between the apparatus B and the instrument panel frame C is made and the male connector m' is fitted to the instrument panel frame C; connections between instrument panel frame C and the dash board F is accomplished; connection between the apparatus A and the apparatus B is made through the pins and the bolt and the apparatus B is released free from the instrument panel C; and finally connection between the instrument panel frame C and the instrument board D is accomplished.

It should be noted that very precise, accurate fitting relation must be assured only between the apparatus A and the apparatus B, and between the male connector m' mounted on the instrument panel frame C and the instrument board D, which is not so difficult.

Industrial applicability

According to the present invention, an electrical connection apparatus that is meant for making electrical connection to the instrument board and an electrical connection apparatus that is intended for making electrical connection to the wire harness can be separately constructed. Thus the wire harness is prevented from growing fat and circuit arrangement within the electrical connection apparatuses is simplified. Further, quick and easy assembly work between the electrical connection apparatuses and also between the female connectors and the male connectors are made possible. Mounting the connectors, which conventionally have been mounted to the electrical connection apparatus, on the instrument panel frame C assures exact and accurate position of the connectors relative to the instrument board D, which facilitates simple and quick assembly procedure without need of difficult alignment of the position of the connector relative to the instrument board.

What is claimed is:

1. A mounting construction of an on-vehicle electrical connection apparatus comprising:
   a first electrical connection apparatus secured in a car body;

a second electrical connection apparatus electrically connected with said first electrical connection apparatus;

an instrument panel frame secured to a dash board and with means for temporarily holding said second electrical connection apparatus so that said second electrical connection apparatus opposes said first electrical connection apparatus; and an instrument board mounted to said instrument panel frame, said instrument board being electrically connected to said second electrical connection apparatus by means of connectors.

2. A mounting construction of an on-vehicle electrical connection apparatus according to claim 1, wherein said instrument panel frame is provided with means for holding said second electrical connection apparatus so that said second electrical connection apparatus can be adjusted positionally relative to said instrument panel frame.

3. A mounting construction of an on-vehicle electrical connection apparatus according to claim 1, wherein said first and second electrical connection apparatuses are provided with guide means for positioning said second electrical connection apparatus relative to said first electrical connection apparatus for securing the apparatuses together by means of a screw.

4. A mounting construction of an on-vehicle electrical connection apparatus according to claim 1, wherein said second electrical connection apparatus has at least one connector connected to the end of wires flexibly extending from said second electrical apparatus, said connector having means by which said connector is mounted to said instrument panel frame.

* * * * *